(12) United States Patent
Liang et al.

(10) Patent No.: US 8,145,021 B2
(45) Date of Patent: Mar. 27, 2012

(54) CABLE FOR CONCENTRATING PHOTOVOLTAIC MODULE

(75) Inventors: Yi-Ping Liang, Taoyuan County (TW); Kuo-Hsin Lin, Taoyuan County (TW); Hwen-Fen Hong, Taoyuan County (TW); Hwa-Yuh Shin, Taoyuan County (TW); Cherng-Tsong Kuo, Taoyuan County (TW)

(73) Assignee: Atomic Energy Council-Institute of Nuclear Research, Taoyuan County (TW)

( * ) Notice: Subject to any disclaimer, the term of this patent is extended or adjusted under 35 U.S.C. 154(b) by 206 days.

(21) Appl. No.: 12/686,766

(22) Filed: Jan. 13, 2010

(65) Prior Publication Data

US 2011/0170834 A1 Jul. 14, 2011

(51) Int. Cl.
*G02B 6/44* (2006.01)
*H01L 25/00* (2006.01)
*H01R 3/00* (2006.01)

(52) U.S. Cl. ........ 385/100; 385/101; 385/102; 385/103; 385/104; 385/105; 385/106; 385/107; 385/113; 385/114; 385/108; 385/109; 385/110; 385/111; 385/112; 136/243; 136/244; 136/245; 136/246; 136/247; 136/248; 136/249; 136/250; 136/251; 136/252; 136/253; 136/254; 136/255; 136/256; 136/257; 136/258; 136/259; 136/260; 136/261; 136/262; 136/263; 136/264; 136/265; 439/500; 439/501; 439/502; 257/E31.001; 257/E31.131

(58) Field of Classification Search .......... 385/100–114; 257/E31.001–E31.131; 136/243–265; 439/500–502
See application file for complete search history.

(56) References Cited

U.S. PATENT DOCUMENTS

| | | | | | |
|---|---|---|---|---|---|
| 3,999,283 | A | * | 12/1976 | Dean et al. | 438/65 |
| 4,152,535 | A | * | 5/1979 | Deminet et al. | 136/258 |
| 4,169,739 | A | * | 10/1979 | Lindmayer | 438/97 |
| 4,194,949 | A | * | 3/1980 | Stark | 202/180 |
| 4,210,121 | A | * | 7/1980 | Stark | 126/573 |
| 4,746,370 | A | * | 5/1988 | Woolf | 136/246 |
| 2001/0001424 | A1 | * | 5/2001 | Sasaoka | 174/50 |
| 2001/0034982 | A1 | * | 11/2001 | Nagao et al. | 52/173.3 |
| 2002/0078991 | A1 | * | 6/2002 | Nagao et al. | 136/251 |
| 2003/0201009 | A1 | * | 10/2003 | Nakajima et al. | 136/251 |
| 2005/0032416 | A1 | * | 2/2005 | Peress et al. | 439/502 |

* cited by examiner

*Primary Examiner* — Brian M. Healy
*Assistant Examiner* — Guy Anderson
(74) *Attorney, Agent, or Firm* — Jackson IPG PLLC; Demian K. Jackson (57) ABSTRACT

Disclosed is a cable for use in a concentrating photovoltaic module. The cable includes at least one strand wrapped with an optically pervious or reflective sheath. The pervious sheath is made of a material that exhibits a penetration rate of 90% and survives a temperature of at least 140 degrees Celsius. The reflective sheath is made of a material that exhibits a reflection rate of 95% and survives a temperature of at least 140 degrees Celsius. The cable is used to connect an anode of the concentrating photovoltaic module to a cathode of the same. The material of the reflective sheath may be isolating.

20 Claims, 9 Drawing Sheets

CABLE FOR CONCENTRATING PHOTOVOLTAIC MODULE

DEFINITION

In this specification, the term "core" will represent a metal strand for conducting electricity or an optical fiber for transmitting an optical signal. The term "sheath" refers to a coating around a core or another sheath.

FIELD OF INVENTION

The present invention relates to a cable for a concentrating photovoltaic module and, more particularly, to a cable including refractory and penetrable or reflective sheaths so that optical energy does not accumulate in the cable, thus preventing the cable from burning

BACKGROUND OF INVENTION

The performance of a concentrating photovoltaic module is related to the quality of cables used therein. The quality of a cable is related to both of cores and sheaths thereof. The refractoriness of and optical absorption by the sheaths are factors to be considered.

For converting sunlight into electricity, a concentrating photovoltaic module includes concentrating panels to concentrate the sunlight onto solar cells. Thus, there are spots of light. The spots of light are supposed to fall on the solar cells. Because of the failure or imprecision of a sunlight-tracing device, the spots of light might however fall on and burn parts of the concentrating photovoltaic module except the solar cells. Cables are most vulnerable among the parts.

In general, when encountering light, an object allows the light to penetrate, reflects the light or absorbs the light. By allowing the light to penetrate, the object lets optical energy go. By reflecting the light, the object bounces the optical energy off. By absorbing the light, the object absorbs the optical energy.

In the concentrating photovoltaic module, a cable includes at least two colored sheaths each for wrapping a core. When the concentrating photovoltaic module converts sunlight into electricity, the colored sheaths absorb more of the optical energy of the sunlight than sheaths of white or metallic colors. Should the spots of light fall on a cable, the sheaths would absorb and convert a large portion of the optical energy into heat that could burn the sheaths and cause short circuit between the cores or between the cores and metal parts, thus affecting the operation of the concentrating photovoltaic module.

As discussed above, the colors of the sheaths are too dark and the surfaces of the sheaths are too rough to dissipate heat after encountering the sunlight. The accumulation of heat in the sheaths cannot be avoided so that the burning of the sheaths cannot be prevented. Hence, the short circuit between the cores or between the cores and the other metal parts cannot be avoided. Hence, the normal operation of the concentrating photovoltaic module is not guaranteed.

The present invention is therefore intended to obviate or at least alleviate the problems encountered in prior art.

SUMMARY OF INVENTION

It is the primary objective of the present invention to provide a cable in which heat does not accumulate.

In a first aspect of the present invention, the cable includes at least one core wrapped with a refractory and penetrable sheath.

It a second aspect of the present invention, the cable includes at least one core wrapped with a refractory and reflective sheath.

Other objectives, advantages and features of the present invention will become apparent from the following description referring to the attached drawings.

BRIEF DESCRIPTION OF DRAWINGS

The present invention will be described via the detailed illustration of seven embodiments referring to the drawings.

DETAILED DESCRIPTION OF EMBODIMENTS

As noted above, in this specification, the term "core" will represent a metal strand for conducting electricity or an optical fiber for transmitting an optical signal. The term "sheath" refers to a coating around a core or another sheath.

Figure 1:
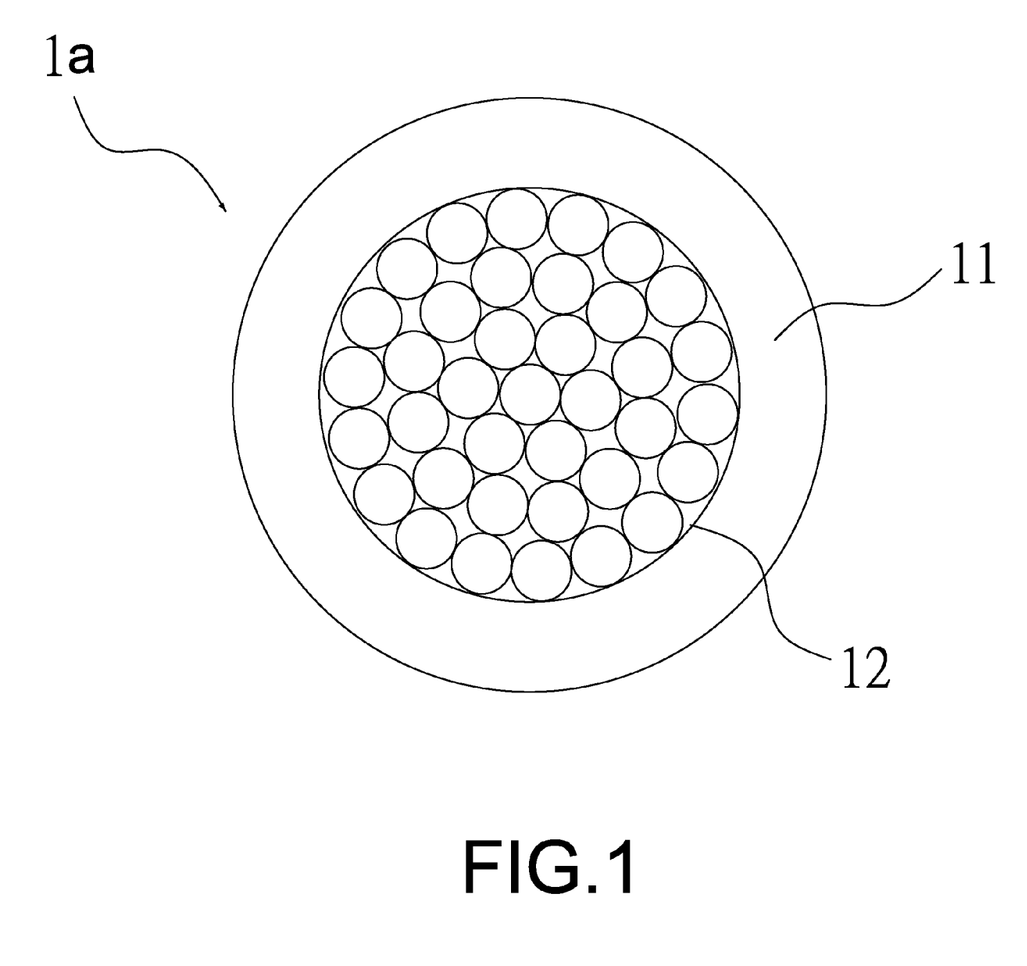
FIG. 1 is a cross-sectional view of a cable according to the first embodiment of the present invention.

The sheath 11 is made of isolating and refractory material. The isolating and refractory material must survive a temperature of at least 140 degrees Celsius. Furthermore, the isolating and refractory material may be a penetrable material such as transparent silicone and transparent plastics. The penetration rate of the isolating, refractory and penetrable material is at least 90%. Alternatively, the isolating and refractory material may be a reflective material such as tin, aluminum and a white and smooth material. The reflection rate of the isolating, refractory and reflective material is at least 95%.

Figure 2:
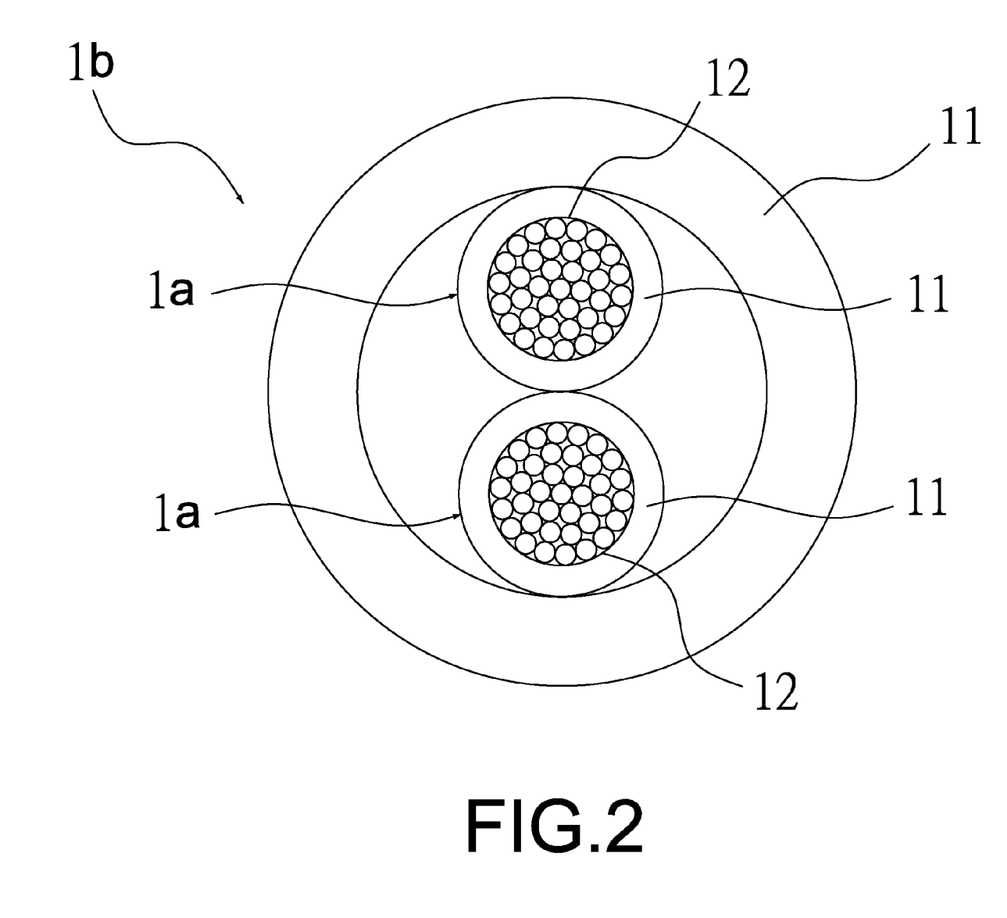
FIG. 2 is a cross-sectional view of a cable according to the second embodiment of the present invention.

Referring to FIG. 2, there is shown a cable 1b according to a second embodiment of the present invention. The cable 1b includes a sheath 11 for wrapping two cables 1a as shown in FIG. 1. The cable 1b is otherwise like the cable 1a.

Figure 3:
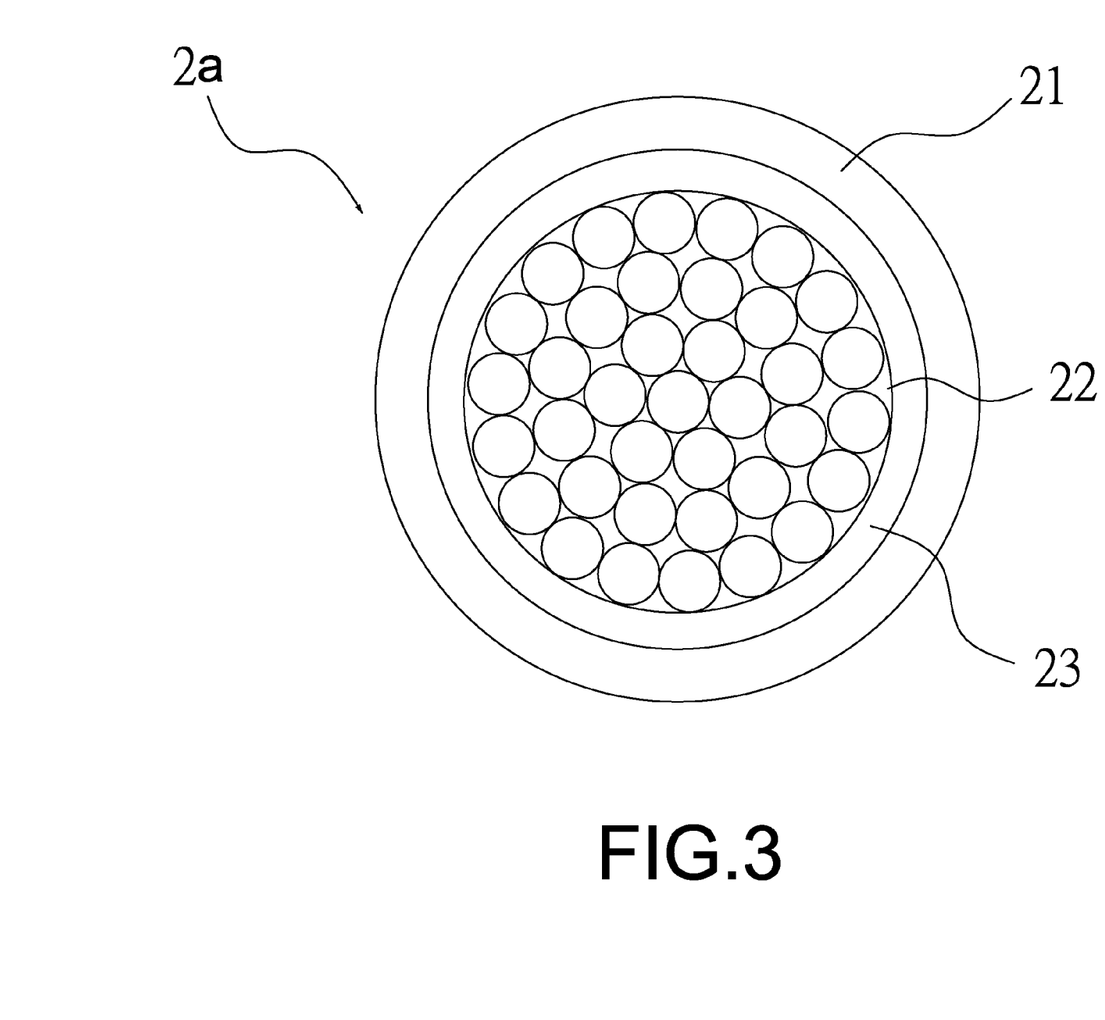
FIG. 3 is a cross-sectional view of a cable according to the third embodiment of the present invention.

Referring to FIG. 3, there is shown a cable 2a according to a third embodiment of the present invention. The cable 2a includes cores 22, an isolating layer 23 for wrapping the cores 22 and another sheath 21 for wrapping the isolating layer 23. The cores 22 are like the cores 12 while the sheath 21 is like the sheath 11.

Figure 4:
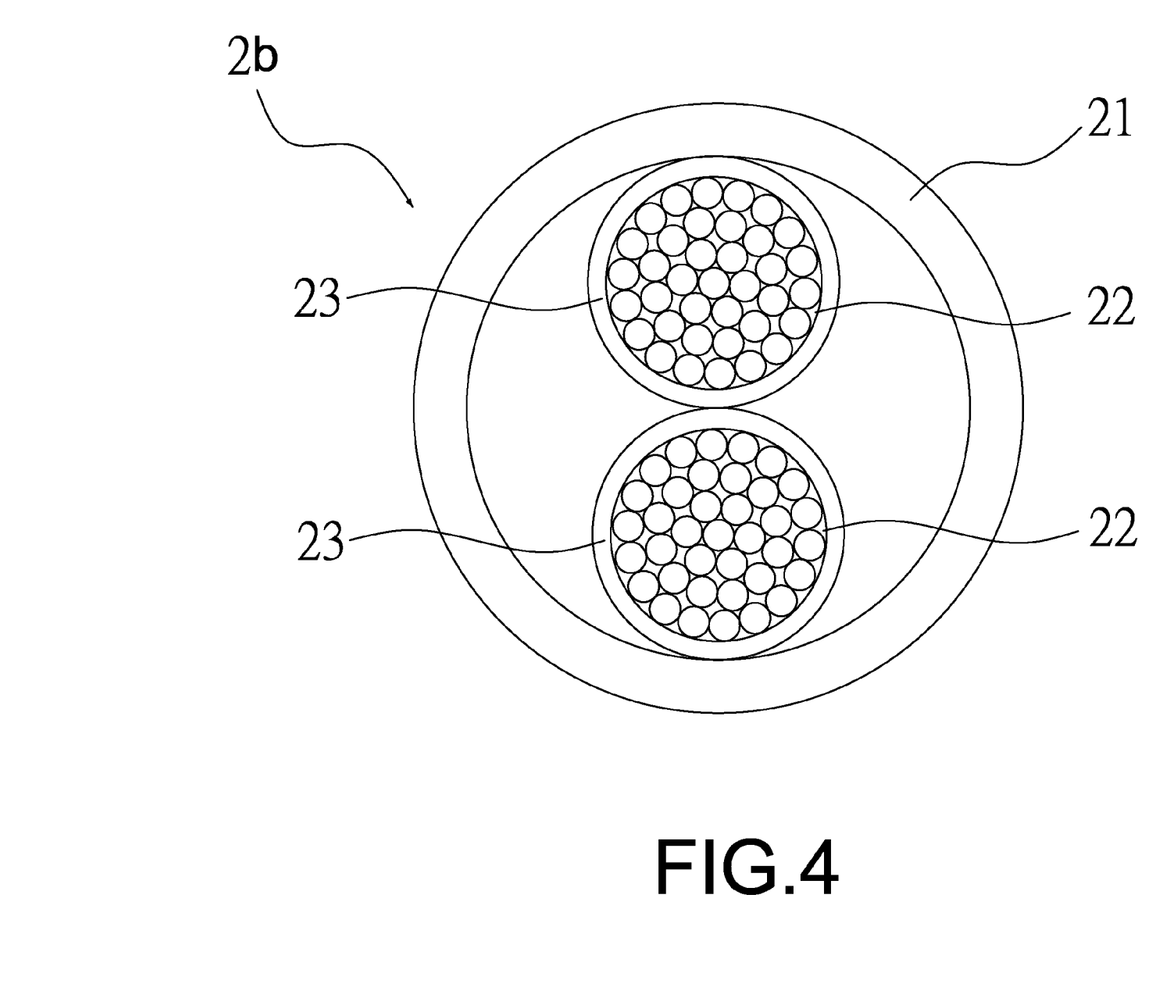
FIG. 4 is a cross-sectional view of a cable according to the fourth embodiment of the present invention.

Referring to FIG. 4, there is shown a cable 2b according to a fourth embodiment of the present invention. The cable 2a includes two bundles of cores 22, two isolating layers 23 each for wrapping a related one of the bundles of cores 22 and a sheath 21 for wrapping the isolating layers 23. The cores 22 are like the cores 12 while the sheath 21 is like the sheath 11.

Figure 5:
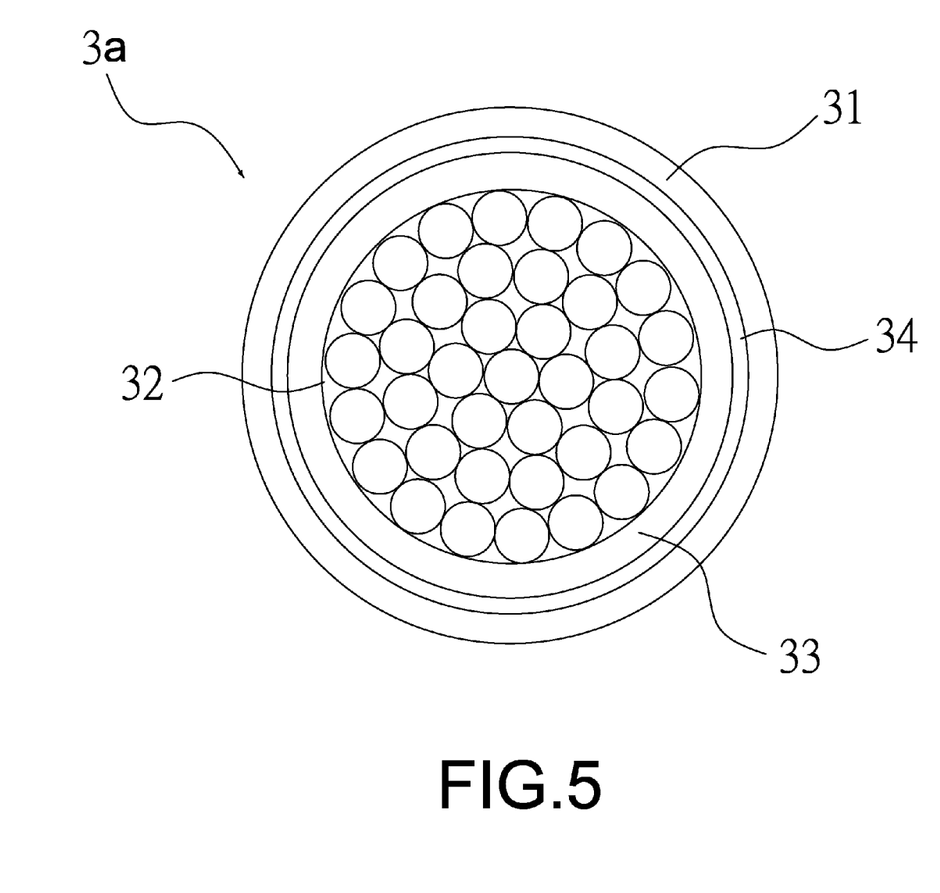
FIG. 5 is a cross-sectional view of a cable according to the fifth embodiment of the present invention.

Referring to FIG. 5, there is shown a cable 3a according to a fifth embodiment of the present invention. The cable 3a includes cores 32, an isolating layer 33 for wrapping the cores 32, a web 34 around the isolating layer 33 and another sheath 31 for wrapping the web 34. The cores 32 are like the cores 12 while the sheath 31 is like the sheath 11. The web 34 is made of a conductive material such as metal.

Figure 6:
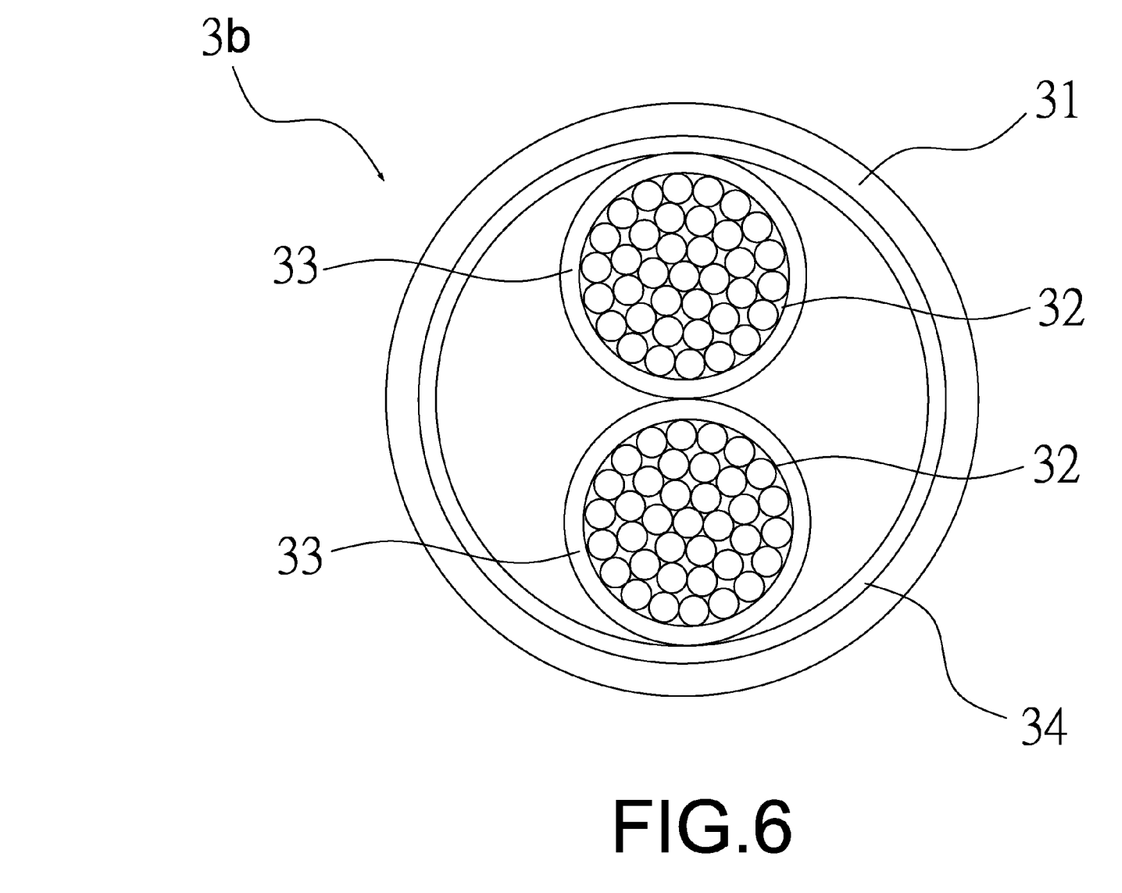
FIG. 6 is a cross-sectional view of a cable according to the sixth embodiment of the present invention.

Referring to FIG. 6, there is shown a cable 3b according to a sixth embodiment of the present invention. The cable 3b includes two bundles of cores 32, two isolating layers 33 each for wrapping one of the bundles of cores 32, a web 34 around the isolating layers 33 and another sheath 31 for wrapping the web 34.

Figure 7:
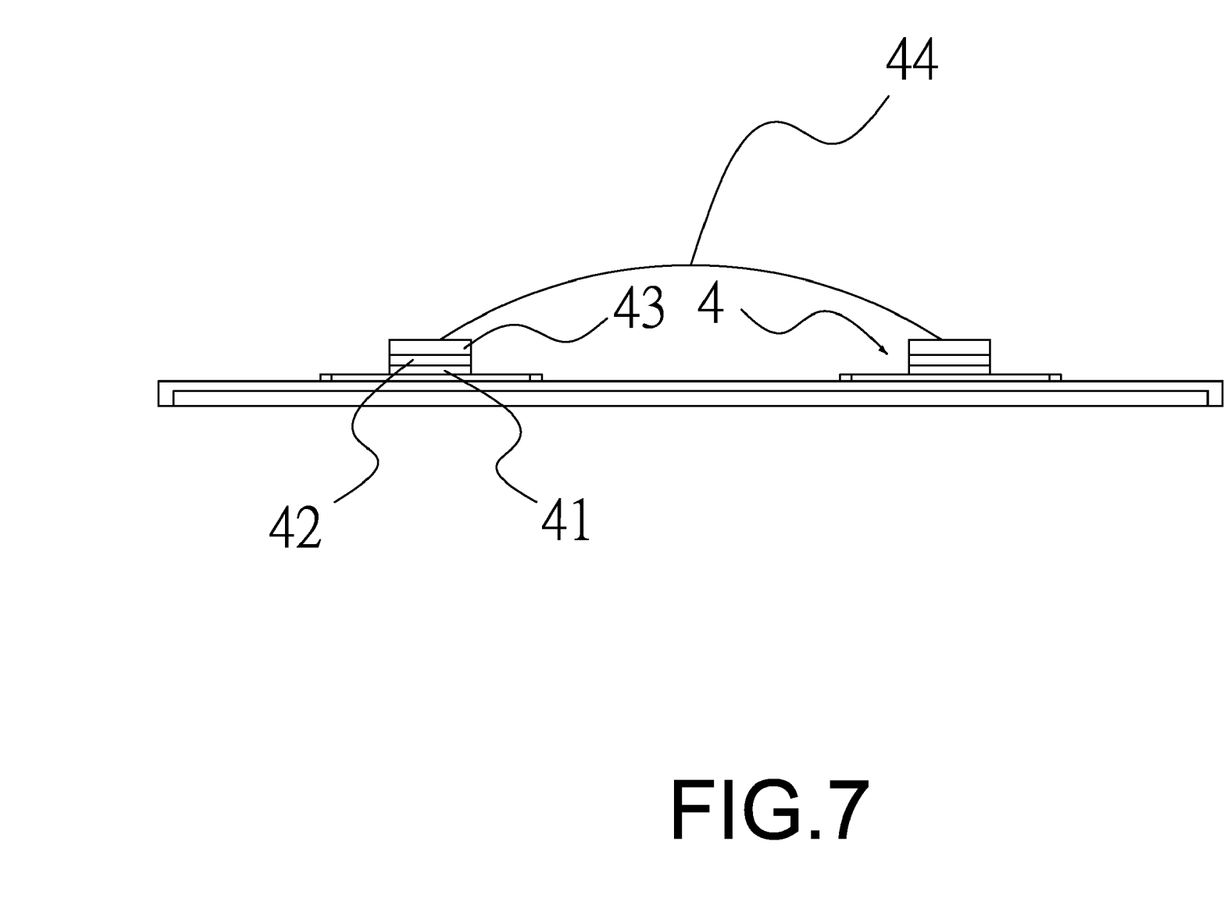
FIG. 7 is a side view of a concentrating photovoltaic module in which cables of the present invention are used.
Figure 8:
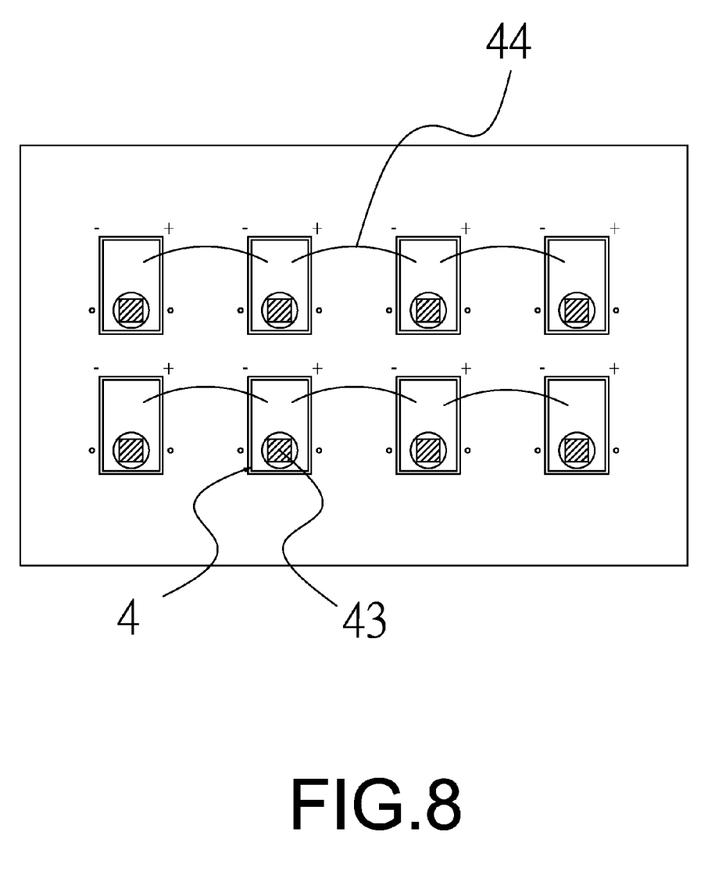
FIG. 8 is a top view of the concentrating photovoltaic module shown in FIG. 7.

Referring to FIGS. 7 and 8, a concentrating photovoltaic module 4 includes cables 44 according to a seventh embodiment of the present invention. The concentrating photovoltaic module 4 includes ceramic substrates 41, conductive layers 42 each provided on a related one of the ceramic substrates 41, solar cells 43 each provided on a related one of the conductive layers 42. The conductive layers 42 are connected to one another through the cables 44.

Figure 9:
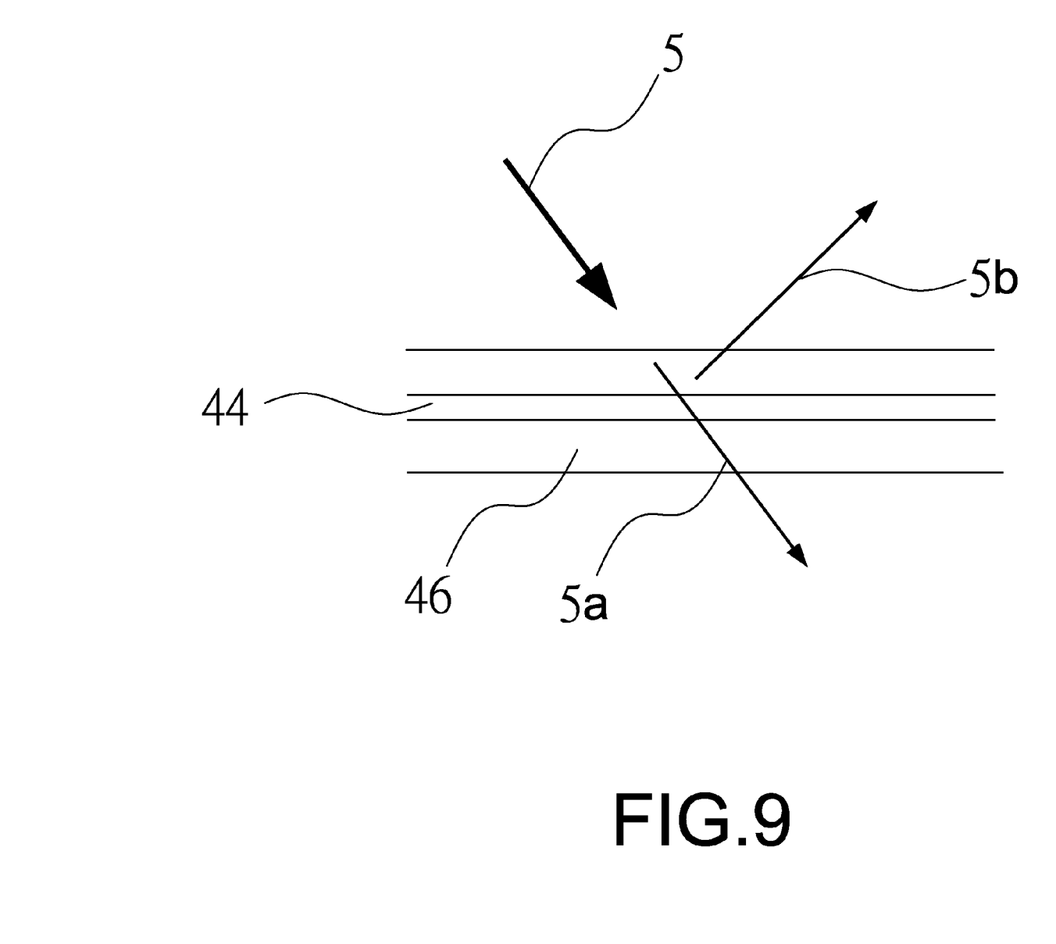
FIG. 9 is a cross-sectional view of a cable according to the seventh embodiment of the present invention in operation.

Referring to FIG. 9, each of the cables 44 includes a core 45 and a sheath 46 for wrapping the core 45. The core 45 is like the cores 12 while the sheath 46 is like the sheath 11. Sunlight falls on the sheath 46 in a direction indicated with an arrow head 5. Where the sheath 46 is made of an isolating, refractory and penetrable material, more than 90% of the sunlight penetrates and leaves the sheath 46 as indicated with an arrow head 5a. Where the sheath 46 is made of an isolating, refractory and reflective material, more than 95% of the sunlight bounces and leaves the sheath 46 as indicated with an arrow head 5b.

As discussed above, after falling on the cable, at least 90% of the sunlight leaves the cable of the present invention. That is, only a small portion of the sunlight is absorbed and converted into heat by the sheath. The heat can easily be dissipated from the sheath. Hence, the sunlight increases the temperature the cable of the present invention to a small extent. Being refractory, the sheath can survive such a small increase in the temperature. Therefore, the sheath is durable, and so is the cable.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A cable for use in a concentrating photovoltaic module, the cable comprising at least one core and a penetrable and refractory sheath for wrapping the core, wherein the penetration rate of the penetrable and refractor sheath is at least 90%, wherein the core includes at least one metal strand or at least one optical fiber.

2. The cable according to claim 1, wherein the penetrable and refractory sheath is made of a material selected from a group consisting of silicone and plastics.

3. The cable according to claim 1, wherein the penetrable and refractory sheath survives at least 140 degrees Celsius.

4. A cable comprising an additional sheath for wrapping two cables according to claim 1, wherein the additional sheath is selected from a group consisting of a penetrable and refractory sheath and a reflective and refractory sheath.

5. The cable according to claim 1 comprising an isolating layer between the core and the penetrable and refractory sheath.

6. The cable according to claim 5, wherein the isolating layer is selected from a group consisting of a penetrable sheath and a reflective sheath.

7. The cable according to claim 1 comprising an isolating layer for wrapping the core and a web between the isolating layer and the penetrable sheath.

8. The cable according to claim 7, wherein the isolating layer is selected from a group consisting of a penetrable sheath and a reflective sheath.

9. The cable according to claim 1, wherein the cable is helical.

10. A cable for use in a concentrating photovoltaic module, the cable comprising at least one core and a reflective and refractory sheath for wrapping the core, wherein the reflection rate of the reflective and refractor sheath is at least 95%, wherein the core includes at least one metal strand or at least one optical fiber.

11. The cable according to claim 10, wherein the penetrable and refractory sheath is made of a material selected from a group consisting of tin, aluminum and white and smooth material.

12. The cable according to claim 10, wherein the reflective and refractory sheath survives at least 140 degrees Celsius.

13. A cable comprising an additional sheath for wrapping two cables according to claim 10, wherein the additional sheath is selected from a group consisting of a penetrable and refractory sheath and a reflective and refractory sheath.

14. The cable according to claim 10 comprising an isolating layer between the core and the reflective and refractory sheath.

15. The cable according to claim 14, wherein the isolating layer is selected from a group consisting of a penetrable sheath and a reflective sheath.

16. A cable for use in a concentrating photovoltaic module, the cable comprising at least one core and a reflective, refractory and isolating sheath for wrapping the core, wherein the reflection rate of the reflective and refractor sheath is at least 95%, wherein the core includes at least one metal strand or at least one optical fiber.

17. The cable according to claim 16, wherein the penetrable, refractory and isolating sheath is made of a white and smooth material.

18. The cable according to claim 16, wherein the reflective and refractory sheath survives at least 140 degrees Celsius.

19. A cable comprising an additional sheath for wrapping two cables according to claim 16, wherein the additional sheath is selected from a group consisting of a penetrable and refractory sheath and a reflective and refractory sheath.

20. The cable according to claim 16, wherein the cable is helical.

* * * * *